(12) United States Patent
Kim et al.

(10) Patent No.: US 9,967,453 B2
(45) Date of Patent: May 8, 2018

(54) METHOD OF OPERATING IMAGE SIGNAL PROCESSOR AND METHOD OF OPERATING IMAGING SYSTEM INCLUDING THE SAME

(71) Applicant: SAMSUNG ELECTRONICS CO., LTD., Suwon-si, Gyeonggi-do (KR)

(72) Inventors: Dae Kwan Kim, Suwon-si (KR); Se Hwan Yun, Hwaseong-si (KR); Chae Sung Kim, Seoul (KR); Dong Ki Min, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 10 days.

(21) Appl. No.: 15/333,336

(22) Filed: Oct. 25, 2016

(65) Prior Publication Data

US 2017/0118399 A1    Apr. 27, 2017

(30) Foreign Application Priority Data

Oct. 26, 2015   (KR) .......................... 10-2015-0148593

(51) Int. Cl.
| | | |
|---|---|---|
| *G02B 13/16* | (2006.01) | |
| *H04N 5/225* | (2006.01) | |
| *H04N 5/232* | (2006.01) | |
| *H04N 5/217* | (2011.01) | |

(52) U.S. Cl.
CPC ....... *H04N 5/23212* (2013.01); *H04N 5/2173* (2013.01)

(58) Field of Classification Search
CPC ............. H04N 5/23212; H04N 5/2173; H04N 5/23264; G06T 2207/20201; G06T 5/002; G06T 5/003; G03B 2207/00; G03B 2207/005
USPC ................ 348/335, 340, 345, 348, 350, 352
See application file for complete search history.

(56) References Cited

U.S. PATENT DOCUMENTS

| | | |
|---|---|---|
| 6,154,574 A | 11/2000 | Paik et al. |
| 7,054,499 B2 | 5/2006 | Watanabe |
| 7,660,478 B2 | 2/2010 | Steinberg et al. |
| 7,711,253 B2 | 5/2010 | Tomita et al. |
| 7,881,551 B2 | 2/2011 | Paik et al. |
| 8,405,760 B2 | 3/2013 | Yamasaki |
| 8,648,918 B2 | 2/2014 | Kauker et al. |
| 8,649,628 B2 | 2/2014 | Albu et al. |
| 8,917,346 B2 | 12/2014 | Geisler et al. |
| 2011/0229049 A1 | 9/2011 | Kondo |
| 2012/0183224 A1* | 7/2012 | Kirsch ................ G06K 9/4619 382/195 |
| 2012/0301012 A1* | 11/2012 | Kakishita ........... H04N 13/0018 382/154 |

* cited by examiner

*Primary Examiner* — Yogesh Aggarwal
(74) *Attorney, Agent, or Firm* — Volentine, Whitt & Francos, PLLC

(57) ABSTRACT

An autofocus method includes receiving a left image having a first blurriness value and a right image having a second blurriness value, filtering the left image so that the first blurriness value becomes the same as the second blurriness value, and generating a control signal for controlling the lens module based on a difference between a third blurriness value of a filtered left image and the second blurriness value.

20 Claims, 12 Drawing Sheets higher blurriness value

FIG. 7A
FIG. 7B
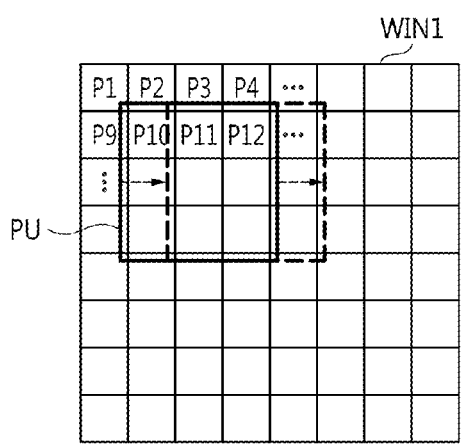
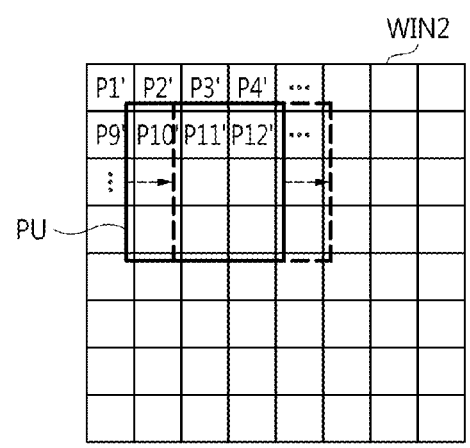
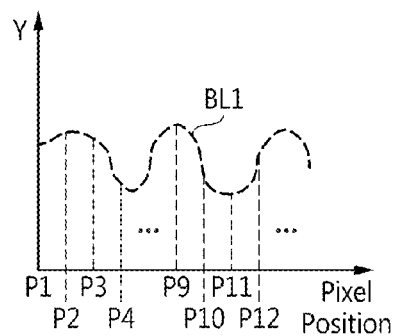
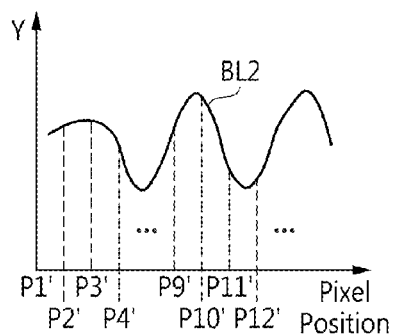

METHOD OF OPERATING IMAGE SIGNAL PROCESSOR AND METHOD OF OPERATING IMAGING SYSTEM INCLUDING THE SAME

PRIORITY STATEMENT

This application claims priority under 35 U.S.C. § 119(a) from Korean Patent Application No. 10-2015-0148593 filed on Oct. 26, 2015, the disclosure of which is hereby incorporated by reference in its entirety.

BACKGROUND

The inventive concept relates to autofocus in the field of imaging. More particularly, the inventive concept relates to optical imaging systems having an autofocus capability and to methods of achieving autofocus in such imaging systems.

Autofocus allows an imaging device of optical imaging systems to focus on a selected region whose image is to be captured. In digital signal lens reflex (DSLR) cameras, phase detection pixels are used for fast autofocus. PAF stands for phase detection autofocus or phase difference autofocus. A full PAF pixel array has a structure in which every pixel includes a plurality of photoelectric conversion elements.

When a digital camera having a PAF pixel array, for example, is out of focus, a left image and a right image represented by the output from each pixel are both blurry but there is disparity between the left image and the right image. In particular, when the optical axis of a photographic lens of the camera is not coincident with the central axis of the image sensor of the camera, the blurriness value of each image varies throughout the image sensor. Thus, using the disparity from images having irregular blurriness values to automatically control the focus of the lens, i.e., to perform an autofocus, may still not bring the image into precise focus.

SUMMARY

According to some examples of the inventive concept, there is provided a method of controlling an imaging system including a lens module, the method comprising generating image information of a left image having a first blurriness value and a right image having a second blurriness value, selectively filtering the image information of one of the left and right images such that the image represented by the filtered image information has a third blurriness value substantially the same as the blurriness value of the other of the left and right images, and controlling the lens module based on the third blurriness value and the blurriness value of said other of the left and right images.

According to other examples of the inventive concept, there is provided an autofocus method of an imaging system which includes a lens, an actuator, an image sensor, and an image signal processor, the method comprising generating electronic information of a left image having a first blurriness value and a right image having a second blurriness value, wherein the information is generated by the image sensor, inputting the electronic information of the left image and the right image to the image signal processor, electronically filtering the information of the left image so that a blurriness value of the filtered left image becomes substantially the same as the second blurriness value, wherein the filtering is performed by the image signal processor, generating a control signal based on a blurriness value of the filtered left image and the second blurriness value, wherein the control signal is generated by the image signal processor, and automatically focusing the lens in response to the control signal, wherein the lens is focused by the actuator.

According to still other example of the inventive concept, there is provided an autofocus method of an imaging system, comprising transmitting an image, captured through a lens of the system, along an optical axis of the lens onto an array of pixels of an image sensor, extracting from the image sensor first image information output by a left-hand part of each of the pixels of the image sensor and second image information output from a right-hand part of each of the pixels of the image sensor, processing the image information including by determining first and second values of a blurriness of first and second images represented by the first image information and the second image information, respectively, and selectively filtering the image information to produce third image information and fourth image information from the first image information and the second image information, respectively, such that a difference between values of the blurriness of respective images represented by the third and fourth image information is less than a difference between the first and second values, and controlling the position of the lens in the system based on the third and fourth information and information on the position of the lens.

BRIEF DESCRIPTION OF THE DRAWINGS

The above and other features and advantages of the inventive concept will become more apparent from the detailed description of examples thereof that follows as made with reference to the attached drawings in which:

FIGS. 7A and 7B are conceptual diagrams of examples of the acquisition of blurriness values of the left and right images, and of plots of blurriness values of the data, according to the inventive concepts;

DETAILED DESCRIPTION

Figure 1:
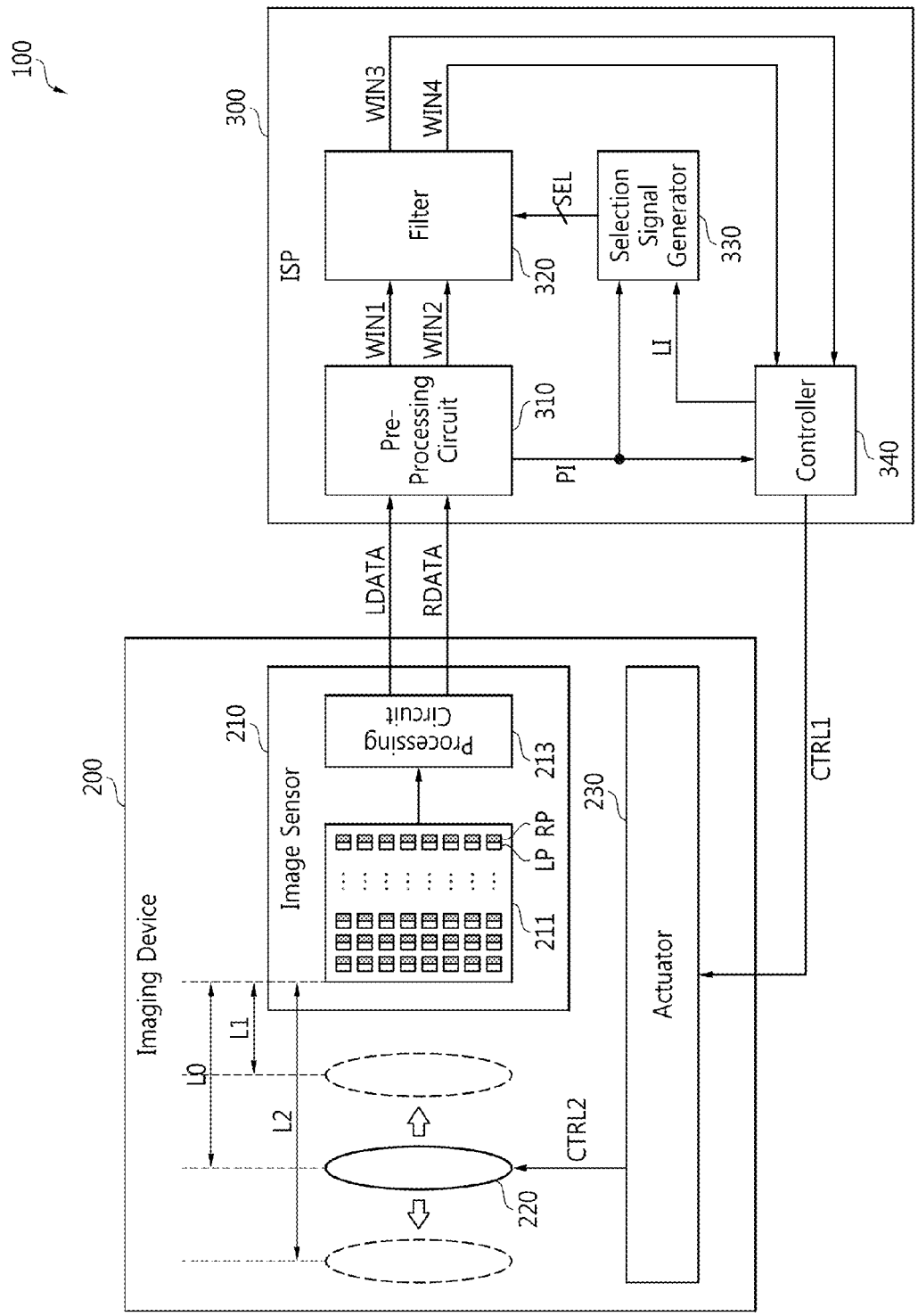
FIG. 1 is a block diagram of an imaging system according to some examples of the inventive concept.

The inventive concept now will be described more fully hereinafter with reference to the accompanying drawings, in which examples of the invention are shown. This invention may, however, be realized in many different forms and should not be construed as limited to the examples set forth herein. Rather, these examples are provided so that this disclosure will be thorough and complete, and will fully convey the scope of the inventive concept to those skilled in the art. In the drawings, the size and relative sizes of layers and regions may be exaggerated for clarity. Like numbers designate like elements throughout the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the inventive concept, examples may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the examples may be physically separated into two or more interacting and discrete blocks without departing from the scope of the inventive concepts. Likewise, the blocks of the examples may be physically combined into more complex blocks without departing from the scope of the inventive concepts.

FIG. 1 is a block diagram of an imaging system 100 according to some examples of the inventive concept. The imaging system 100 may include an imaging device 200 and an image signal processor (ISP) 300. The imaging device 200 may be a lens module. The ISP 300 may be part of the module or of a system processor and may be provided by means of a separate semiconductor chip.

The imaging system 100 may be that of a mobile device. The mobile device may be a laptop computer, a cellular phone, a smart phone, a tablet personal computer (PC), a personal digital assistant (PDA), an enterprise digital assistant (EDA), a digital still camera, a digital video camera, a mobile internet device (MID), a wearable computer, an Internet of Things (IoT) device, an Internet of Everything (IoE) device, or a drone, but the inventive concept is not limited to these examples. The imaging system 100 may be that of a digital signal lens reflex (DSLR) camera but is not limited thereto.

The imaging device 200 may be a device that can generate first image data LDATA and second image data RDATA. The first image data LDATA and the second image data RDATA may be generated simultaneously or in parallel. The imaging device 200 may include an image sensor 210, a lens 220, and an actuator 230.

The image sensor 210 may be an image sensor chip such as a complementary metal oxide semiconductor (CMOS) image sensor chip. The image sensor 210 may include a pixel array 211 and a processing circuit 213.

The pixel array 211 may include a plurality of pixels. The pixels may be arranged in a Bayer pattern, but the inventive concept is not limited thereto. The pixel array 211 may include a Bayer pattern color filter array. The pixel array 211 may include a plurality of phase detection pixels.

Each of the pixels may be a red pixel, a green pixel, a blue pixel, an infrared pixel, a yellow pixel, a cyan pixel, a magenta pixel, or a white pixel but is not limited thereto. Each of the pixels may include a plurality of photoelectric conversion elements, i.e., at least a first photoelectric conversion element LP and a second photoelectric conversion element RP. That is, although each pixel in the examples illustrated in FIG. 1 has only two photoelectric conversion elements LP and RP, each of the pixels of the pixel array 211 may include at least three photoelectric conversion elements. In any case, when each pixel includes a plurality of photoelectric conversion elements, the pixel array 211 may be referred to as a full phase detection autofocus or phase difference autofocus (PAF) pixel array.

The processing circuit 213 may process pixel signals output from the pixels of the pixel array 211 and may generate the first image data LDATA and the second image data RDATA from the pixel signals. The first image data LDATA may be generated by the first photoelectric conversion element LP of each pixel and the second image data RDATA may be generated by the second photoelectric conversion element RP of the pixel. The first image data LDATA may be one of long-exposure image data and short-exposure image data; the second image data RDATA may be the other of the two image data. The processing circuit 213 may output the first image data LDATA and the second image data RDATA simultaneously or in parallel to the ISP 300.

The lens 220 may focus incident light on the pixel array 211. The lens 220 may be an optical lens. The lens 220 may move toward or away from the image sensor 210 in response to a second control signal CTRL2 output from the actuator 230. The actuator 230 may generate the second control signal CTRL2 for changing the position of the lens 220 in response to a first control signal CTRL1 output from a controller 340.

The ISP 300 may include a pre-processing circuit 310, an electronic filter 320, a selection signal generator 330, and the controller 340. The pre-processing circuit 310 may receive and process the first image data LDATA to generate a signal representative of a left image WIN1 (referred to hereinafter simply as left image WIN1) having a first blurriness value and may receive and process the second image data RDATA to generate a signal representative of a right image WIN2 (referred to hereinafter simply as right image WIN2) having a second blurriness value. The left image WIN1 and the right image WIN2 may be generated pixel by pixel or window by window. Here, the term "window" refers to a plurality of pixels.

The pre-processing circuit 310 may generate and output position information PI regarding the pixels used to generate the first image data LDATA output from the imaging device 200. Alternatively, the pre-processing circuit 310 may generate and output position information PI regarding the pixels used to generate the second image data RDATA output from the imaging device 200. Since each of the pixels of the pixel array 211 includes a plurality of photoelectric conversion elements, the position of a current pixel generating the first image data LDATA may be the same as or similar to that generating the second image data RDATA. A procedure for processing the first image data LDATA and the second image data RDATA in the pre-processing circuit 310 will be described in detail later on with reference to FIGS. 2 through 3B.

The filter 320 may receive the left image WIN1 having the first blurriness value and the right image WIN2 having the second blurriness value and may (electronically) filter either the left image WIN1 or the right image WIN2 in response to a filter selection signal SEL so that the first blurriness value becomes equal to the second blurriness value. Alternatively, the filter 320 may filter either the left image WIN1 or the right image WIN2 in response to the filter selection signal SEL so that the second blurriness value becomes equal to the first blurriness value. The left image WIN1 may be part of the first image data LDATA; the right image WIN2 may be part of the second image data RDATA. The operation of the filter 320 which filters one of the left image WIN1 and the right image WIN2 using the filter selection signal SEL will be described in more detail later on with reference to FIG. 4. For instance, (electronically) filtering either the left image WIN1 or the right image WIN2 means (electronically) filtering image information of one of the left and right images (WIN1 or WIN2).

The selection signal generator 330 may generate the filter selection signal SEL using the position information PI of the left image WIN1 and/or lens position information LI and may output the filter selection signal SEL to the filter 320. The filter selection signal SEL may include at least one bit.

The selection signal generator 330 may include a register (not shown) which stores information (or data) indicating whether to operate the filter 320 as a blur filter or a sharpness filter. The blur filter is an example of a low pass filter (LPF) and the sharpness filter is an example of a high pass filter (HPF).

The controller 340 may receive (a signal representative of) a left image WIN3 having a third blurriness value and (a signal representative of) a right image signal WIN4 having a fourth blurriness value from the filter 320 and may generate the first control signal CTRL1 for controlling the lens 220 using a difference between the third blurriness value and the fourth blurriness value, the lens position information LI, and/or the position information PI regarding the left image signal WIN1. As described above, the position information PI may instead be about the right image WIN2.

The controller 340 may calculate a current position of the lens 220 of the imaging device 200 and may output the lens position information LI corresponding to the result of the calculation. The controller 340 may calculate the current position of the lens 220 using the first control signal CTRL1 output to the actuator 230 and output the lens position information LI corresponding to the result of the calculation, but a method of generating the lens position information LI is not limited to this example. Because the controller 340 generates the lens position information LI, it functions as a lens position calculator. Although the controller 340 is part of the ISP 300 in the examples illustrated in FIG. 1, the controller 340 may be part of the imaging device 200 or may be otherwise discrete from the ISP 300 in other examples.

Figure 2:
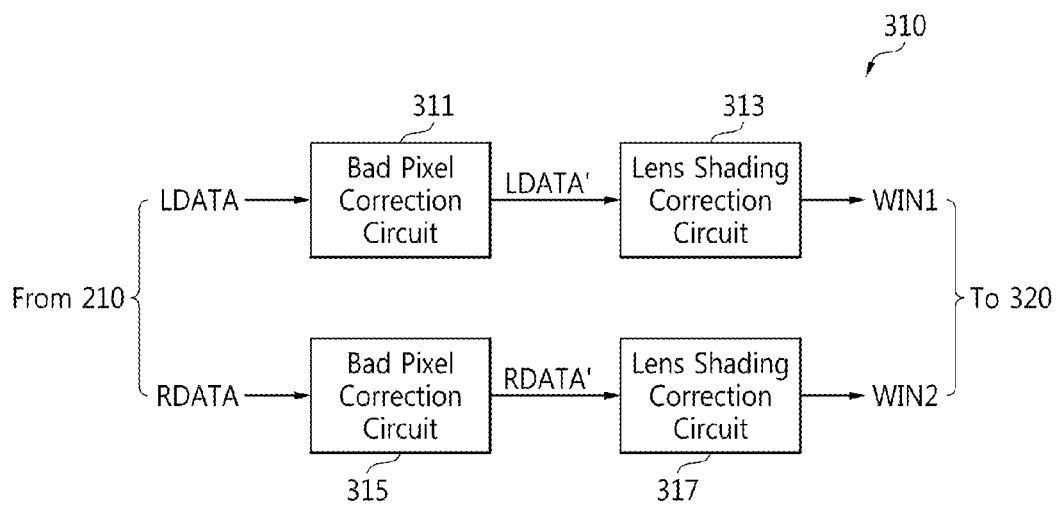
FIG. 2 is a block diagram of a pre-processing circuit illustrated in FIG. 1 according to some examples of the inventive concept.

FIG. 2 is a block diagram of the pre-processing circuit 310 illustrated in FIG. 1 according to some examples of the inventive concept. Referring to FIGS. 1 and 2, the pre-processing circuit 310 may include bad pixel correction circuits 311 and 315 and lens shading correction circuits 313 and 317.

The first bad pixel correction circuit 311 may receive the first image data LDATA, may detect or correct data produced from a bad pixel or bad pixels in the first image data LDATA, and may output image data LDATA' having corrected pixel values. The second bad pixel correction circuit 315 may receive the second image data RDATA, may detect or correct data produced from a bad pixel or bad pixels in the second image data RDATA, and may output image data RDATA' having corrected pixel values.

The first lens shading correction circuit 313 may receive the image data LDATA', may correct lens shading of the image data LDATA', and may output the left image WIN1 as the result of the lens shading correction. The second lens shading correction circuit 313 may receive the image data RDATA', may correct lens shading of the image data RDATA', and may output the right image WIN2 as the result of the lens shading correction.

Figure 3A:
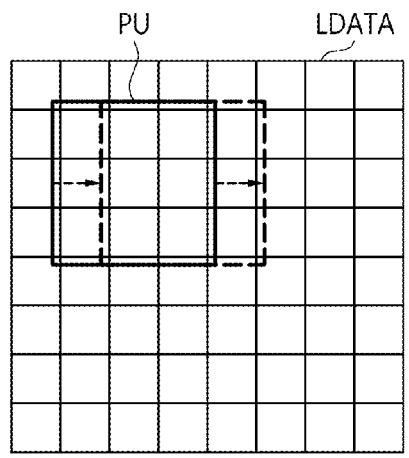
FIG. 3A is a conceptual diagram of examples of the acquisition of first image data including a left image having a first blurriness value according to the inventive concept.
Figure 3B:
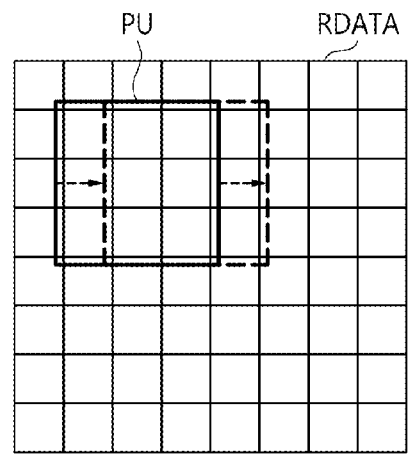
FIG. 3B is a conceptual diagram of examples of the acquisition of second image data including a right image having a second blurriness value according to the inventive concept.

FIG. 3A shows the first image data LDATA including the left image WIN1 having the first blurriness value. FIG. 3B shows the second image data RDATA including the right image WIN2 having the second blurriness value.

Referring to FIGS. 1 through 3B, the pre-processing circuit 310 may extract the left image WIN1 corresponding to a first window from the first image data LDATA, as shown in FIG. 3A, and may extract the right image WIN1 corresponding to a second window from the second image data RDATA, as shown in FIG. 3B. The pre-processing circuit 310 may shift the first window up, down, left, and right to scan the first image data LDATA and may shift the second window up, down, left, and right to scan the second image data RDATA. The first window and the second window may be moved in the same direction simultaneously.

Although the first and second windows PU have a size of 3*3 pixels in the examples illustrated in FIGS. 3A and 3B, this is just an example. Each window may have a size of m*n pixels, where "m" and "n" are natural numbers of at least 2 and it may be that m=n or m≠n.

As described above, a pixel may be a physical pixel of the pixel array 211 and the data may refer to pixel data corresponding to signals output from the physical pixels. The pixel data output by each physical pixel may have an RGB data format or a YUV data format, but the inventive concept is not limited to these examples.

Figure 4:
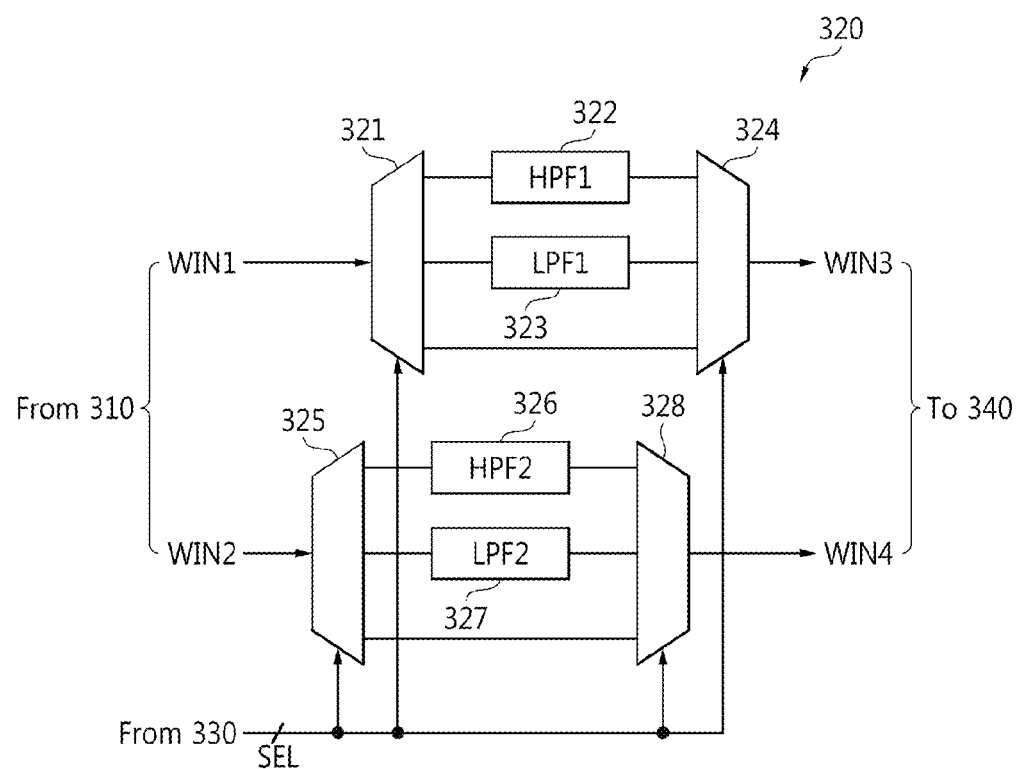
FIG. 4 is an internal circuit diagram of a filter illustrated in FIG. 1.

FIG. 4 is an internal circuit diagram of the electronic filter 320 illustrated in FIG. 1. Referring to FIG. 4, the filter 320 may include selection circuits 321, 324, 325, and 328, a first HPF 322, a first LPF 323, a second HPF 326, and a second LPF 327.

When the filter 320 is used as a sharpness filter, the sharpness filter 320 may filter either the left image WIN1 or the right image WIN2. When the filter 320 is used as a blur filter, the blur filter 320 may also filter either the left image WIN1 or the right image WIN2.

For instance, when the second blurriness value is lower than the first blurriness value, the first selection circuit 321 may output the left image WIN1 to the first HPF 322; the second selection circuit 324 may output an output signal of the first HPF 322 as the left image WIN3 having the third blurriness value; the third selection circuit 325 may bypass the right image WIN2; and the fourth selection circuit 328 may output a bypassed signal as the right image WIN4, in response to the filter selection signal SEL in order to decrease the first blurriness value. Alternatively, when the second blurriness value is lower than the first blurriness value, the first selection circuit 321 may bypass the left image WIN1; the second selection circuit 324 may output a bypassed signal as the left image WIN3; the third selection circuit 325 may output the right image WIN2 to the second LPF 327; and the fourth selection circuit 328 may output an output signal of the second LPF 327 as the right image WIN4 having the fourth blurriness value, in response to the filter selection signal SEL in order to increase the second blurriness value. In other words, the filter 320 may output the images WIN3 and WIN4 having the same blurriness value in response to the filter selection signal SEL.

Figure 5C:
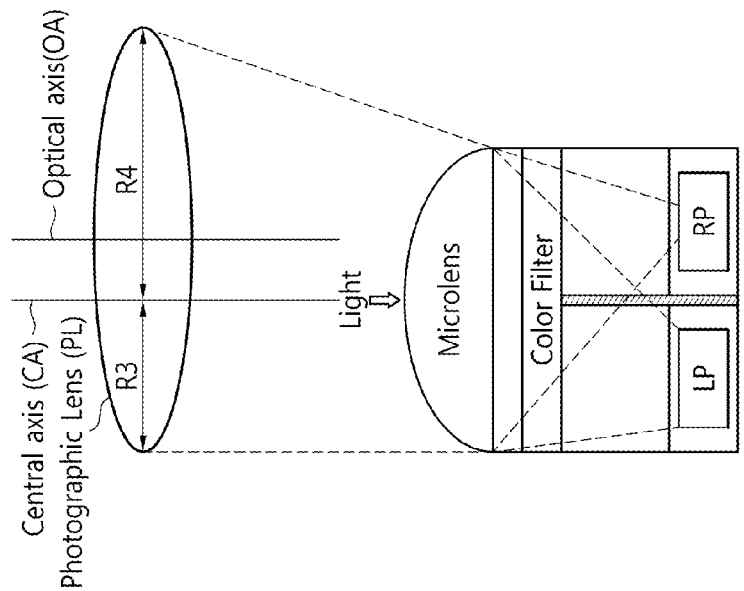
FIGS. 5B and 5C are each a schematic diagram of the image sensor as pertains to one pixel of the image sensor.
Figure 5B:
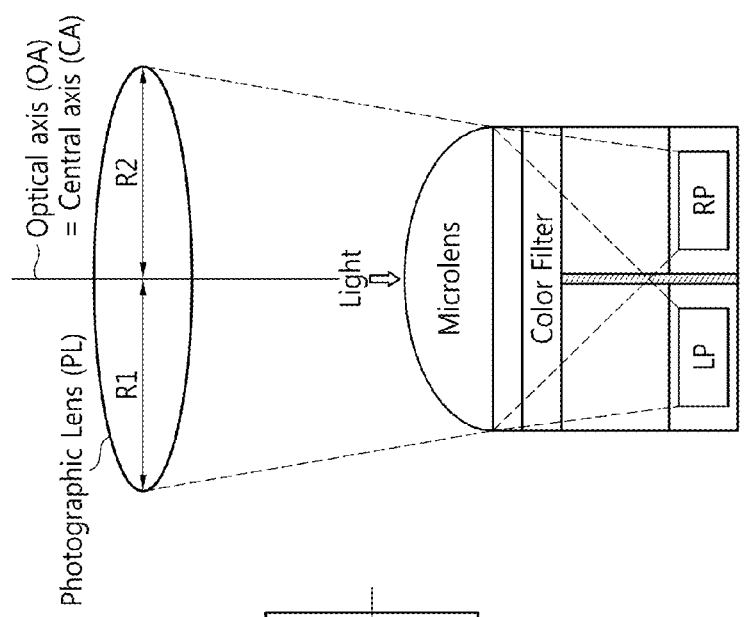
Figure 5A:
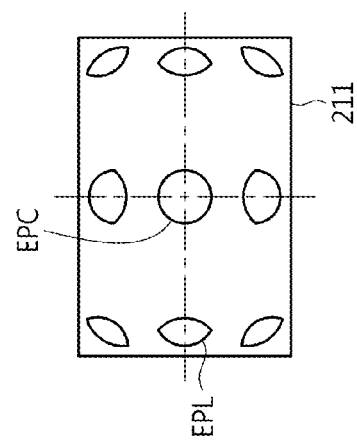
FIG. 5A is a diagram of an example of an exit pupil of the image sensor illustrated in FIG. 1.

FIGS. 5A through 6B are conceptual diagrams for explaining a difference in blurriness between a left image and a right image contained in data output from the image sensor 210. FIG. 5A shows the shapes of an exit pupil for the image sensor 210. The exit pupil represents the aperture of the imaging device 200 when the image sensor 210 captures an image of an object viewed by the camera lens 220. In this example, the photographic lens (PL) may be the lens 220 illustrated in FIG. 1.

Referring to FIGS. 5A and 5B, when a central axis (CA) of a pixel coincides with an optical axis (OA) of the photographic lens (PL), the distance R1 from the CA of the pixel to one side of the PL (the left end of the PL in the figure) is equal to the distance R2 from the CA of the pixel to the other side (right end) of the PL. Accordingly, the amount of light incident on the first photoelectric conversion element LP is the same as the amount of light incident on the second photoelectric conversion element RP. As a result, a central exit pupil EPC is formed.

Figure 6A:
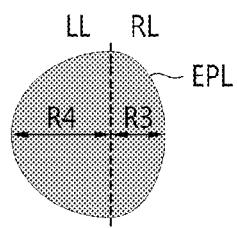
FIG. 6A is a diagram of an exit pupil of a pixel of the image sensor.

Referring to FIGS. 5A, 5C, and 6A when the CA of the pixel is displaced to one side, i.e., to the left in this example, from the OA of the PL, the distance R4 from the CA of the pixel to the right end of the PL is longer than the distance R3 from the CA of the pixel to the left end of the PL. Accordingly, the amount of light incident on the first photoelectric conversion element LP is greater than the amount of light incident on the second photoelectric conversion element RP. As a result, a left exit pupil EPL is formed.

Thus, as for each of the pixels of the pixel array 211, the amount of light incident on the first photoelectric conversion element LP used to generate a left image and the amount of light incident on the second photoelectric conversion element RP used to generate a right image depend on the relative position of the pixel. Accordingly, the shape of exit pupil depends on the relative position or location of the pixel in the image sensor 210.

Figure 6B:
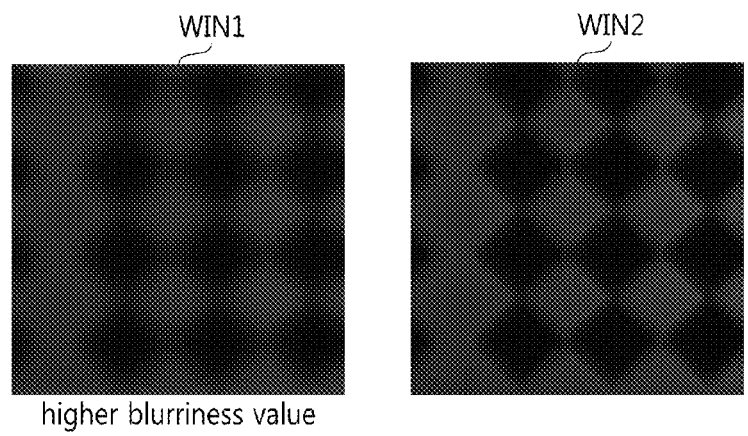
FIG. 6B shows "left" and "right" images that would be output from the image sensor and illustrate a difference in blurriness between the left image and the right image.

Referring to FIGS. 5A, 5C, and 6B, when the amount of light LL incident on the first photoelectric conversion element LP is greater than the amount of light RL incident on the second photoelectric conversion element RP, the blurriness value of the left image WIN1 is higher than that of the right image WIN2. That is, the left image WIN1 and the right image WIN2 have different blurriness values.

FIGS. 7A through 9B are graphs and conceptual diagrams showing the blurriness value of an image before filtering and the blurriness value of the image after the filtering. For convenience' sake in the description, it is assumed that the each of the images WIN1 and WIN2 is output from more than an array of 3*3 pixels and each window PU has a size of 3*3 pixels.

Referring to FIG. 7A, the distance along the X-axis indicates the position of each pixel and a first blur plot BL1 shows blurriness values of a first window PU as the left image WIN1 is scanned using the first window PU. A blurriness value of the signal represented by plot BL1, i.e., of the left image WIN1, may be a blurriness value for one pixel or a representative one of the blurriness values for a plurality of pixels. A representative one of the blurriness values may be an average, a maximum, a minimum, or a weighted average of the values but is not limited thereto. For instance, the representative value of pixels P1, P2, P3, P4, . . . , P9, P10, P11, P12, . . . , i.e., of the WIN1 data, may be a representative value of the blurriness values of nine pixels of the first window PU.

Referring to FIG. 7B, the distance along the X-axis indicates the position of each pixel and a second blur plot BL2 shows blurriness values of pixels of a second window PU as the right image WIN2 is scanned using the second window PU. A blurriness value of the signal represented by plot BL2, i.e., of the image WIN2, may be a blurriness value for one pixel or a representative one of the blurriness values for a plurality of pixels. A representative one of the blurriness values may be an average, a maximum, a minimum, or a weighted average of the blurriness values but is not limited thereto. For instance, a representative value of pixels P1', P2', P3', P4', . . . , P9', P10', P11', P12', of the WIN2 data, . . . may be a representative value of the blurriness values of nine pixels of the second window PU.

The size of the first window PU may be the same as the size of the second window PU. For instance, the blurriness value of the pixel P1 may be different from that of the pixel P2 even though the size and position of the first window PU with respect to the pixel P1 are the same as those of the first window PU with respect to the pixel P2.

As shown in FIGS. 7A and 7B, when the blurriness value of the left image WIN1 is higher than that of the right image WIN2, the first blur plot BL1 of the left image signal WIN1 may be more distorted than the second blur plot BL2 of the right image WIN2. In particular, the higher the blurriness values of pixels, the more distorted may be the shape of the plot of the blurriness values.

Figure 8A:
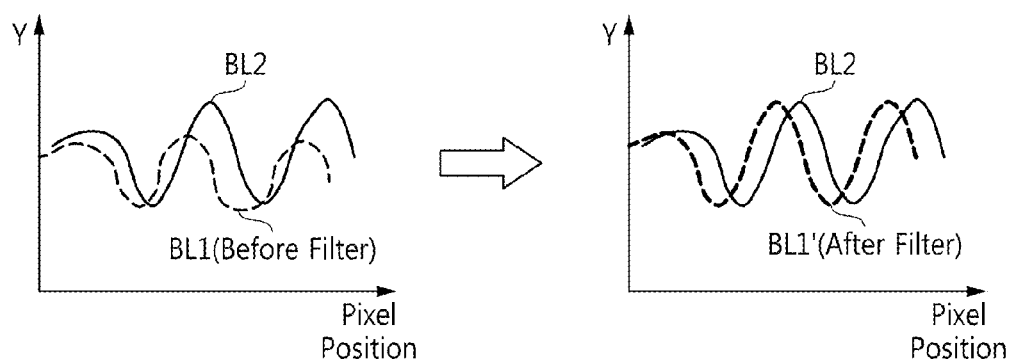
FIGS. 8A and 9A are graphs of plots of the blurriness values before and after a filtering process according to the inventive concept.

Referring to FIGS. 1 and 8A, when the blurriness values of the left image WIN1 are higher than those of the right image WIN2, the first blur plot BL1 for the left image WIN1 may be more distorted than the second blur plot BL2 for the right image WIN2. The filter 320 may adjust first blurriness values of the first blur plot BL1 to be the same as corresponding second blurriness values of the second blur plot BL2, so that the first blur plot BL1 for the left image WIN1 is converted to a third blur plot BL1' having a shape similar to that of the second blur plot BL2 for the right image WIN2. Here, BL1 denotes a blur plot before filtering and BL1' denotes a blur plot after filtering.

Figure 8B:
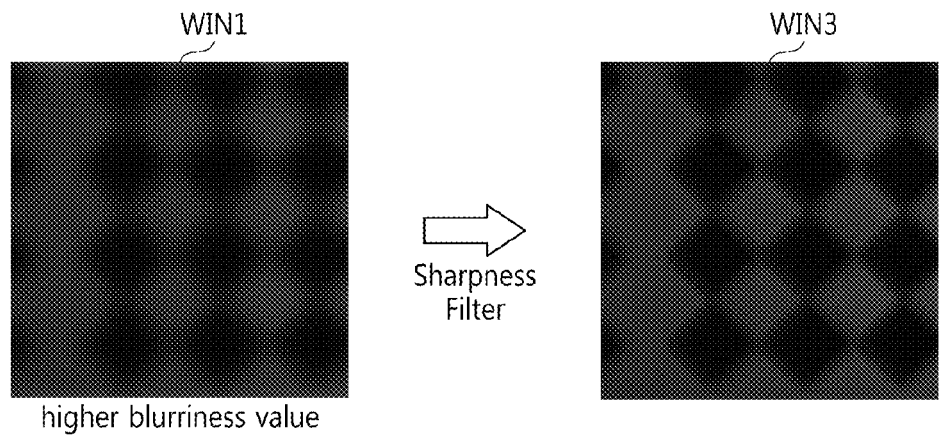
FIGS. 8B and 9B are diagrams of examples of images output before and after the filtering according to the inventive concept.

The selection signal generator 330 may generate the filter selection signal SEL for operating the filter 320 as a sharpness filter. Referring to FIGS. 1 and 8B, the filter 320 may filter the left image WIN1 having the first blurriness values using the sharpness filter in response to the filter selection signal SEL and may output a filtered image as the left image WIN3 having third blurriness values. Accordingly, the left image WIN3 (the image after filtering) may be sharper than the left image WIN1 (the corresponding image before filtering).

Figure 9A:
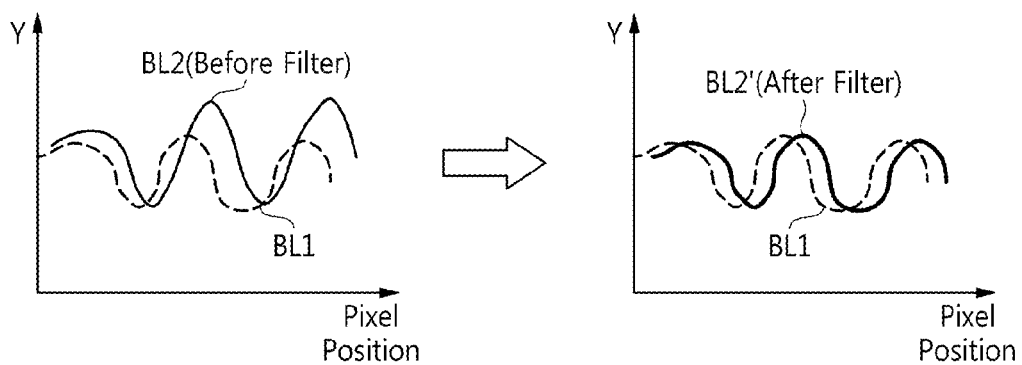

Referring to FIGS. 1 and 9A, when the blurriness values of the left image WIN1 are higher than those of the right image WIN2, the first blur plot BL1 for the left image WIN1 may be more distorted than the second blur plot BL2 for the right image WIN2. The filter 320 may adjust second blurriness values of the second blur plot BL2 to be the same as corresponding first blurriness values, so that the second blur plot BL2 for the right image WIN2 is converted to a fourth blur plot BL2' having a shape similar to that of the first blur plot BL1 for the left image WIN1. The selection signal generator 330 may generate the filter selection signal SEL for operating the filter 320 as a blur filter.

Figure 9B:
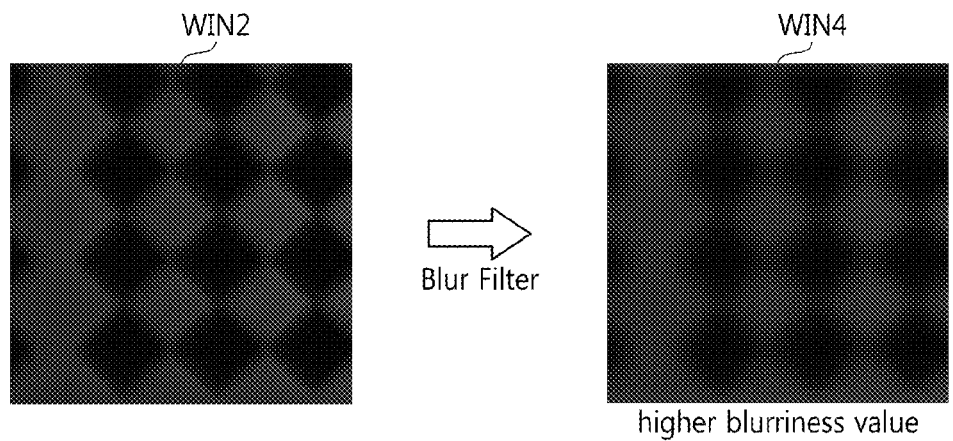

Referring to FIGS. 1 and 9B, the filter 320 may filter the right image WIN2 having the second blurriness values using the blur filter in response to the filter selection signal SEL and may output a filtered image as the right image WIN4 having fourth blurriness values. Accordingly, the right image WIN4 (i.e., the filtered image) may be blurrier than the right image WIN2 (the image before filtering).

Figure 10:
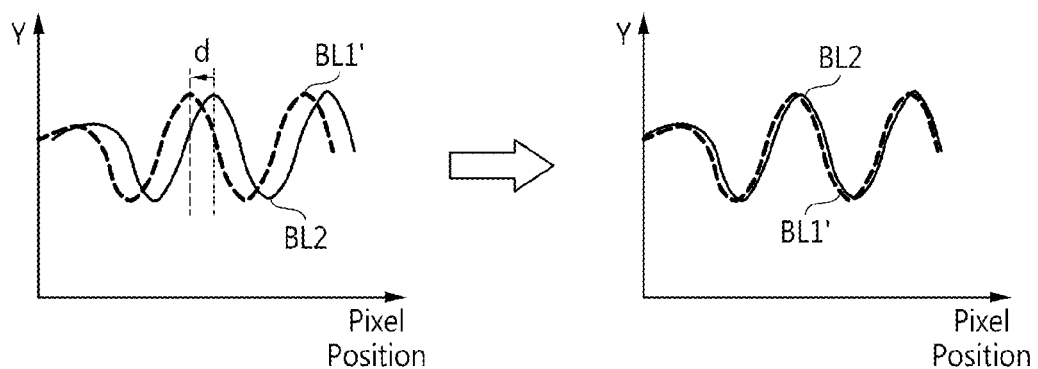
FIG. 10 is a phase graph illustrating a disparity and phase compensation according to the inventive concept.

FIG. 10 illustrates a disparity, and a phase graph after phase compensation. Referring to FIGS. 1 and 10, the controller 340 may calculate a disparity "d" between the second blur plot BL2 and a filtered first blur plot, i.e., the third plot graph BL1' illustrated in FIG. 8A or the first blur plot BL1 and a filtered second blur plot, i.e., the fourth blur plot BL2' illustrated in FIG. 9A.

The controller 340 may in effect shift one of the filtered first blur plot BL1' and the second blur plot BL2 on the basis of the other of the two plots BL1' and BL2 in order to minimize the difference between the filtered first blur plot BL1' and the second blur plot BL2. For instance, the distance or offset "d" may be the disparity in the case in which the difference between the filtered first blur plot BL1' and the second blur graph BL2 is minimized when the second blur graph BL2 is shifted to the left by "d".

The controller 340 may calculate the disparity for each phase detection pixel and may output the first control signal CTRL1 using the calculated disparity. As mentioned above, in these examples, each phase detection pixel may include a plurality of the photoelectric conversion elements LP and RP.

The actuator 230 may generate the second control signal CTRL2 for changing or controlling the position of the lens 220 in response to the first control signal CTRL1 output from the controller 340. The focal length of the imaging device 200 in the example of FIG. 1 is the distance between the lens 220 and the surface of the image sensor 210 when the object whose image is to be captured is in focus. The focal length may vary with a distance between the lens 220 and the object and also with the distance between the lens 220 and the surface of the image sensor 210. That is, the imaging device 200 is assumed to be focused when the lens 220 is located the focal length from the image sensor 210. If the focus of the lens 220 falls in front of the image sensor 210 when the lens 220 is located at a first distance L0 from the image sensor 210, the lens 220 may be automatically moved (i.e., auto-focused) to a place at a second distance L1 from the image sensor 210 according to the control of the actuator 230. If the focus of the lens 220 falls behind the image sensor 210 when the lens 220 is located at the first distance L0 from the image sensor 210, the lens 220 may be automatically moved (i.e., auto-focused) to a place at a third distance L3 from the image sensor 210 according to the control of the actuator 230.

Since the ISP 300 calculates a disparity from images having the same blurriness value, the ISP 300 precisely adjusts the focus of the lens 220, thereby providing excellent autofocus accuracy.

Figure 11:
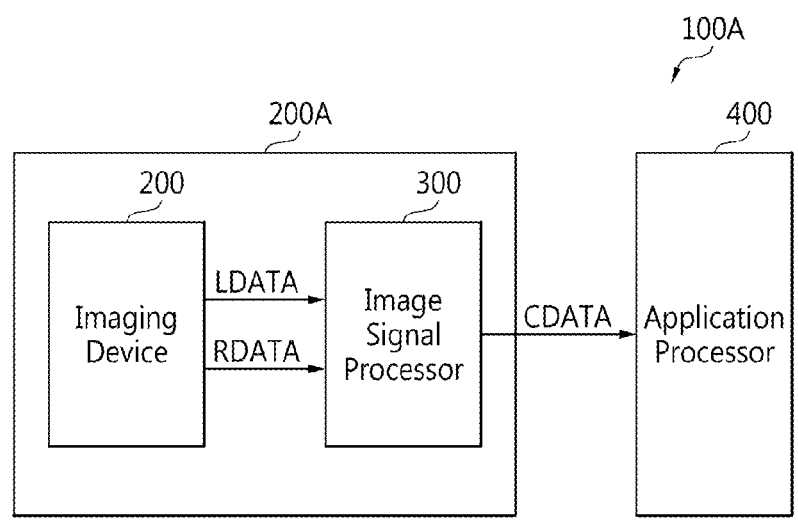
FIG. 11 is a block diagram of an imaging system according to other examples of the inventive concept.

FIG. 11 is a block diagram of an imaging system 100A according to other examples of the inventive concept. Referring to FIGS. 1 through 11, the imaging system 100A may include a first apparatus 200A and an application processor 400. The first apparatus 200A may include the imaging device 200 and the ISP 300. The first apparatus 200A may output focus-adjusted image data CDATA to the application processor 400.

When the image sensor 210 in the imaging device 200 is implemented as a first semiconductor chip and the ISP 300 is implemented as a second semiconductor chip, the image sensor 210 and the ISP 300 may be packaged in a single package. The package may be a multi-chip package (MCP) but is not limited thereto. The image sensor 210 and the ISP 300 may share a single semiconductor substrate.

Figure 12:
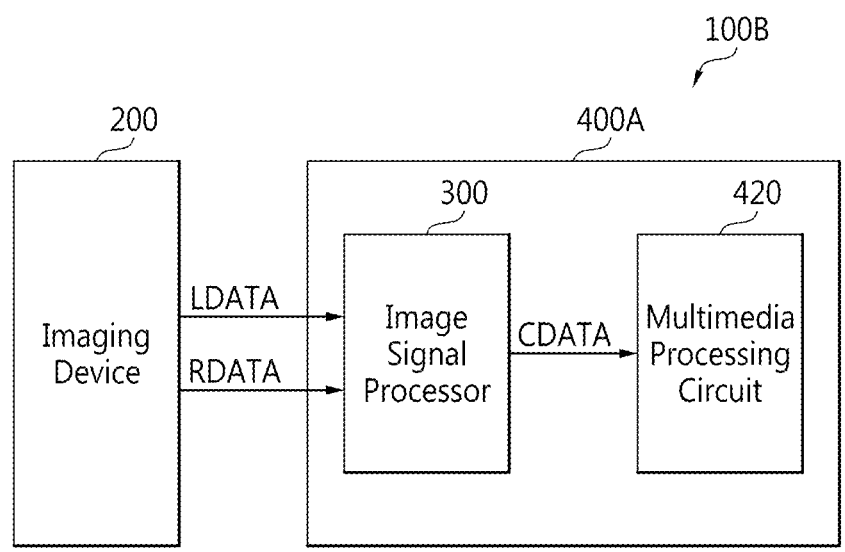
FIG. 12 is a block diagram of an imaging system according to still other examples of the inventive concept.

FIG. 12 is a block diagram of an imaging system 100B according to still other examples of the inventive concept. Referring to FIGS. 1 through 10 and FIG. 12, the imaging system 100B may include the imaging device 200 and an application processor 400A. The application processor 400A may include the ISP 300 and a multimedia processing circuit 420. The multimedia processing circuit 420 may be implemented as a codec, but the inventive concept is not limited to such an example. The multimedia processing circuit 420 may receive and process the image data CDATA output from the ISP 300.

Figure 13:
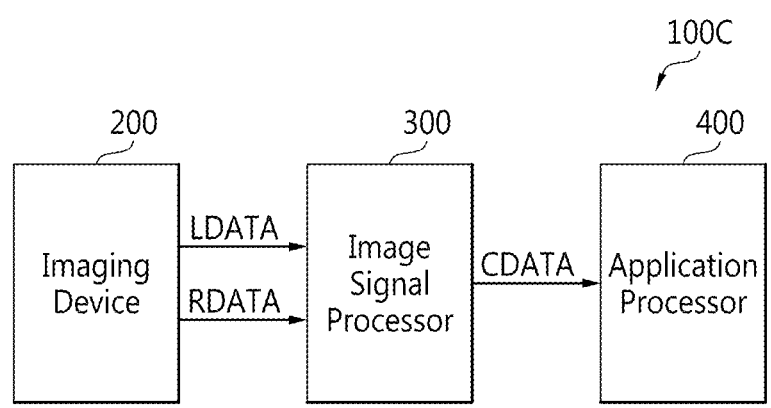
FIG. 13 is a block diagram of an imaging system according to yet other examples of the inventive concept.

FIG. 13 is a block diagram of an imaging system 100C according to yet other examples of the inventive concept. Referring to FIGS. 1 through 10 and FIG. 13 the imaging system 100C may include the imaging device 200, the ISP 300, and the application processor 400. The image sensor 210 in the imaging device 200 is implemented as a first semiconductor chip; the ISP 300 is implemented as a second semiconductor chip; the application processor 400 is implemented as a third semiconductor chip. The application processor 400 may receive and process the image data CDATA output from the ISP 300.

Figure 14:
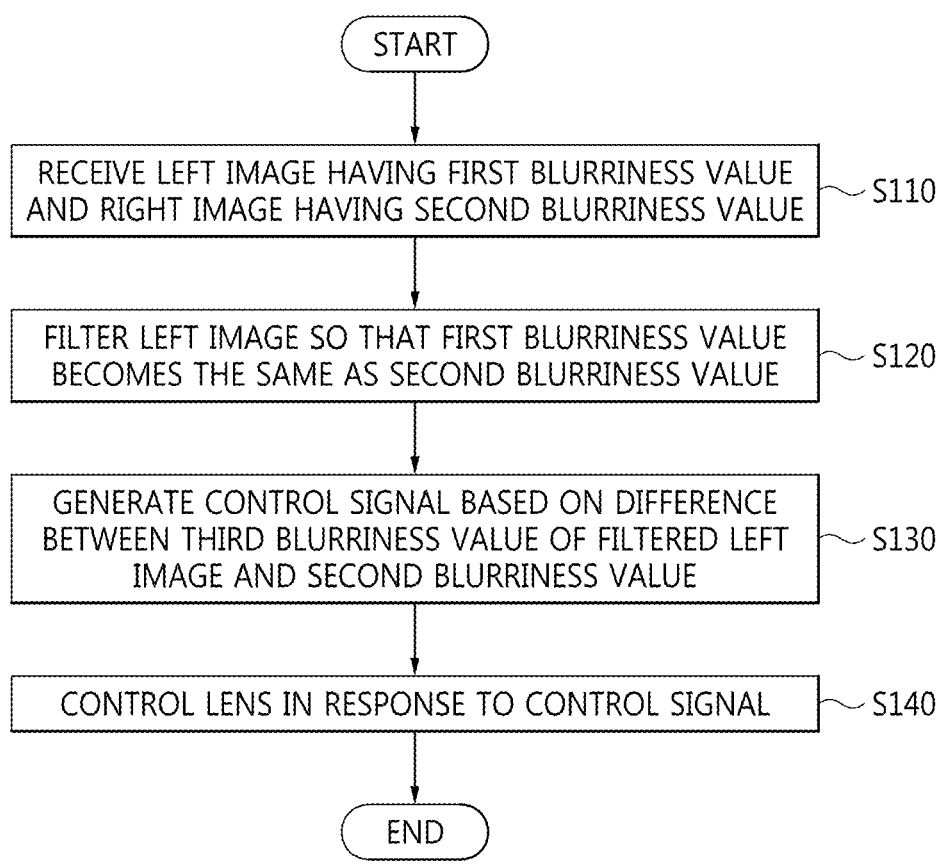
FIG. 14 is a flowchart of a method of operation, namely, an autofocus method, of the imaging system illustrated in FIG. 1, 11, 12, or 13 according to some examples of the inventive concept.

FIG. 14 is a flowchart of a method of operating the imaging system 100, 100A, 100B, or 100C illustrated in FIG. 1, 11, 12, or 13 according to some examples of the inventive concept. Referring to FIGS. 1 through 14, the pre-processing circuit 310 may receive the first image data LDATA and the second image data RDATA from the imaging device 200, may extract the left image WIN1 having first blurriness values from the first image data LDATA, and may extract the right image WIN2 having second blurriness values from the second image data RDATA.

The filter 320 may receive the left image signal WIN1 having the first blurriness values and the right image WIN2 having the second blurriness values in operation S110. The filter 320 may electronically filter the left image WIN1 so that the first blurriness values become the same as the second blurriness values in operation S120. For instance, when a second blurriness value is lower than a first blurriness value, the left image signal WIN1 may be filtered using in effect what amounts to a sharpness filter to decrease the first blurriness value. When the second blurriness value is higher than the first blurriness value, the left image signal WIN1 may be filtered using in effect what amounts to a blur filter to increase the first blurriness value.

The controller 340 may generate a control signal based on a difference between the second blurriness value and a third blurriness value of the filtered left image signal WIN3 in operation S130. The control signal may be the first control signal CTRL1 for controlling the position of the lens 220 of the imaging device 200. The actuator 230 may generate the second control signal CTRL2 for controlling the position of the lens 220 in response to the first control signal CTRL1 in operation S140.

Figure 15:
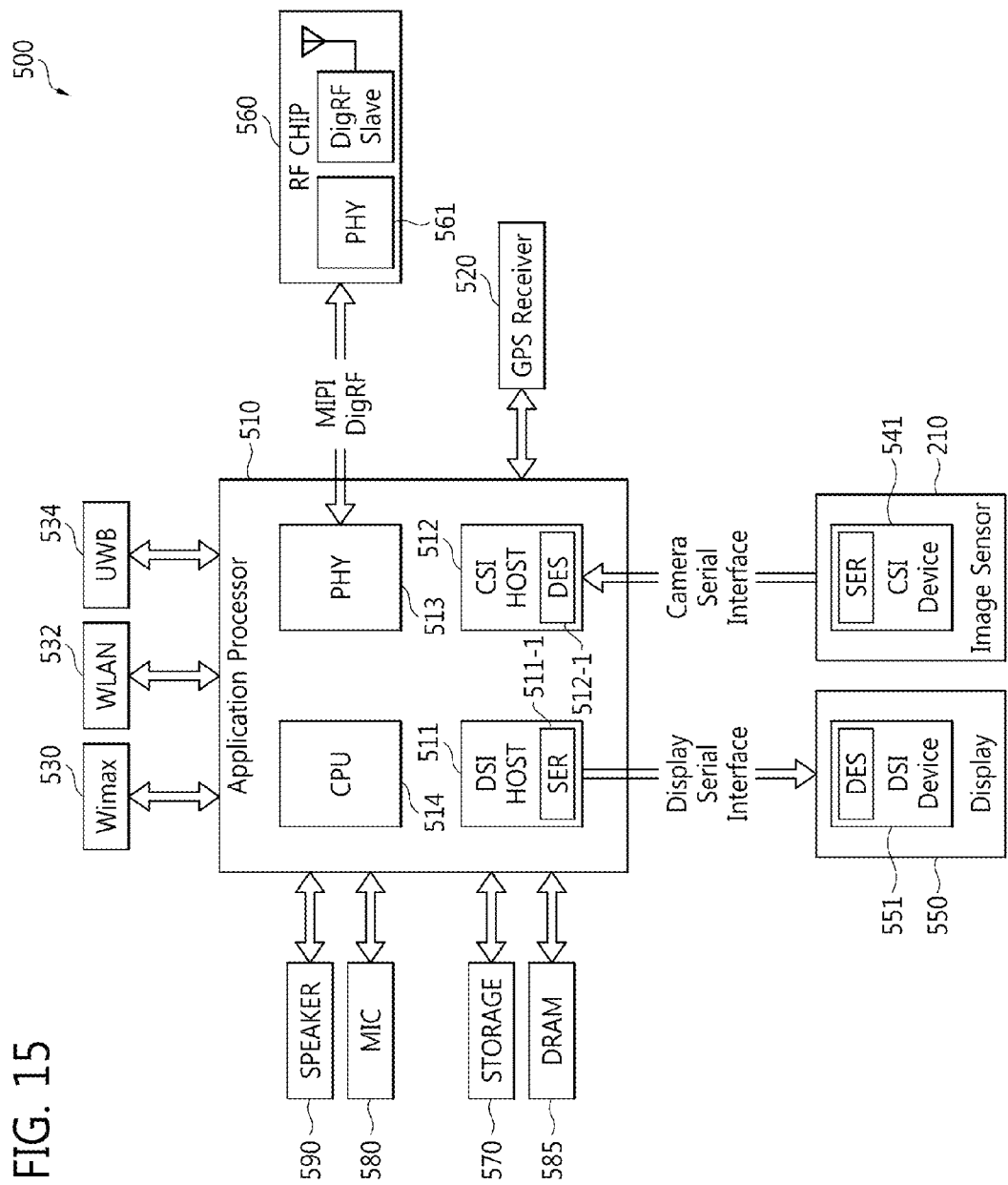
FIG. 15 is a block diagram of an imaging system according to other examples of the inventive concept.

FIG. 15 is a block diagram of an imaging system 500 according to further examples of the inventive concept. Referring to FIGS. 1 through 15, the imaging system 500 may be that of a mobile device which uses or supports a mobile industry processor interface (MIPI®).

The ISP 300 may be implemented in various different ways. The ISP 300 may be packaged in the same semiconductor package as the image sensor 210, may be packaged in the same package as an application processor 510, or may be implemented as a separate semiconductor package connected between the imaging device 200 and the application processor 510. The application processor 510 may correspond to the application processor 400 illustrated in FIG. 11 or 13 or the application processor 400A illustrated in FIG. 12.

The imaging system 500 includes the application processor 510, the image sensor 210, and a display 550. A camera serial interface (CSI) host 512 of the application processor 510 may perform serial communication with a CSI device 541 of the image sensor 210 through CSI. A deserializer DES or 512-1 and a serializer SER may be provided as parts of the CSI host 512 and the CSI device 541, respectively.

Although example illustrated in FIG. 15 comprises image sensor 210, the image sensor 210 may be replaced with the imaging device 200 illustrated in FIG. 1 or the first apparatus 200A comprising the imaging device 200 illustrated in FIG. 11 in other examples. The application processor 510 may also include the ISP 300 and the multimedia processing circuit 420, as shown in FIG. 12.

A display serial interface (DSI) host 511 of the application processor 510 may perform serial communication with a DSI device 551 in the display 550 through DSI. A serializer SER or 511-1 and a deserializer DES may be provided as parts of the DSI host 511 and the DSI device 551, respectively. The serializers SER and the deserializers DES each may process an electrical signal or an optical signal.

The imaging system 500 may also include a radio frequency (RF) chip 560 communicating with the application processor 510. A physical layer (PHY) 513 in the application processor 510 and a PHY 561 in the RF chip 560 may communicate with each other according to an MIPI DigRF.

The imaging system 500 may further include a global positioning system (GPS) receiver 520, a memory 585 such as dynamic random access memory (DRAM), a data storage 570 including non-volatile memory such as NAND flash memory, a microphone (MIC) 580, and a speaker 590.

The memory 585 or the data storage 570 and the application processor 510 may be implemented together in a single package such as a package-on-package (PoP) or a system-in-package (SiP). In these examples, the memory 585 or the data storage 570 may be stacked on the application processor 510.

The imaging system 500 may communicate with external devices using at least one communication protocol or standard, such as worldwide interoperability for microwave access (WiMAX) 530, wireless local area network (WLAN) 532, ultra-wideband (UWB) 534, or long term evolution (LTE™) (not shown). The imaging system 500 may communicate with external wireless communication devices using Bluetooth or WiFi.

As described above, according to some examples of the inventive concept, a method of operating an ISP includes filtering one of images output from an image sensor so that the images have the same blurriness value. The method also includes calculating a disparity from the images having the same blurriness values and adjusting the focus of a lens based on the disparity, thereby providing an enhanced autofocus accuracy.

Although the inventive concept has been particularly shown and described with reference to examples thereof, it will be understood by those of ordinary skill in the art that various changes in forms and details may be made to the disclosed examples without departing from the spirit and scope of the inventive concept as defined by the following claims.

What is claimed is:

1. A method of operation of an imaging system including a lens module, the method comprising:
   generating image information of a left image having a first blurriness value and a right image having a second blurriness value;
   selectively filtering the image information of one of the left and right images such that the image represented by the filtered image information has a third blurriness value substantially the same as the blurriness value of the other of the left and right images; and
   controlling the lens module based on the third blurriness value and the blurriness value of said other of the left and right images.

2. The method of claim 1, wherein the filtering comprises a high pass filtering operation to increase the sharpness of the left image.

3. The method of claim 1, wherein the filtering comprises a low pass filtering operation to increase the blurriness of the left image.

4. The method of claim 1, further comprising generating first image data and second image data, wherein the image information of said one of the left and right images is part of the first image data that has been subjected to lens shading correction and the image information of said other of the left and right images is part of the second image data that has been subjected to lens shading correction.

5. The method of claim 1, wherein the image information of each of the left image and the right image is produced pixel by pixel or window by window.

6. The method of claim 1, wherein the generating the control signal comprises generating the control signal for controlling a position of a lens of the lens module based on position information of the lens, position information of the said one of the left and right images, and a disparity between the filtered image information and the image information of said other of the left and right images.

7. An autofocus method of an imaging system which includes a lens, an actuator, an image sensor, and an image signal processor, the method comprising:
generating electronic information of a left image having a first blurriness value and a right image having a second blurriness value, wherein the information is generated by the image sensor;
inputting the electronic information of the left image and the right image to the image signal processor;
electronically filtering the information of the left image so that the blurriness value of the filtered left image becomes substantially the same as the second blurriness value, wherein the filtering is performed by the image signal processor;
generating a control signal based on the blurriness value of the filtered left image and the second blurriness value, wherein the control signal is generated by the image signal processor; and
automatically focusing the lens in response to the control signal, wherein the lens is focused by the actuator.

8. The method of claim 7, wherein the filtering comprises filtering the information of the left image to decrease the first blurriness value when the second blurriness value is lower than the first blurriness value.

9. The method of claim 7, wherein the filtering comprises filtering the information of the left image to increase the first blurriness value when the second blurriness value is higher than the first blurriness value.

10. The method of claim 7, further comprising generating first image data and second image data, wherein the information of the left image is part of the first image data that has been subjected to lens shading correction and the information of the right image is part of the second image data that has been subjected to lens shading correction.

11. The method of claim 7, wherein the information of each of the left image and the right image comprises pixel data.

12. The method of claim 7, wherein the generating the control signal comprises generating the control signal for controlling a position of the lens based on position information of the lens, position information of the left image, and the difference between the third blurriness value and the second blurriness value.

13. The method of claim 7, wherein the imaging system is a digital single lens reflex (DSLR) camera.

14. The method of claim 7, wherein the image sensor comprises a plurality of pixels and each of the pixels comprises a plurality of photoelectric conversion elements.

15. The method of claim 7, wherein the image sensor comprises a plurality of phase detection pixels.

16. An autofocus method of an imaging system having a lens and an image sensor including an array of pixels, the comprising:
transmitting an image, captured through the lens of the imaging system, along an optical axis of the lens onto the array of pixels of the image sensor;
extracting from the image sensor first image information output by a left-hand part of each of the pixels of the image sensor and second image information output from a right-hand part of each of the pixels of the image sensor;
processing the image information including by:
determining first and second values of a blurriness of first and second images represented by the first image information and the second image information, respectively, and
selectively filtering the image information to produce third image information and fourth image information from the first image information and the second image information, respectively, such that a difference between values of a blurriness of respective images represented by the third and fourth image information is less than a difference between the first and second values; and
controlling the position of the lens in the system based on the third and fourth information and information on the position of the lens.

17. The method as claimed in claim 16, wherein each of the pixels of the array comprises more than one photoelectric converter that converts light incident on the pixel to an electric signal, and the extracting of the first and second image information from the image sensor is performed on a pixel by pixel basis or on a window of pixels by window of pixels basis.

18. The method as claimed in claim 17, wherein the electronic filtering of the image information to produce said third and fourth image information comprises electronically filtering one of the first and second image information to produce filtered image information without electronically filtering the other of the first and second image information.

19. The method as claimed in claim 18, wherein the electronic filtering comprises selectively generating filtered image information that represents an image which is blurrier than the image represented by said one of the first and second image information and filtered image information that represents an image which is sharper than the image represented by said one of the first and second image information, whereby the electronic filtering selectively serves as a blur filter and a sharpness filter.

20. The method as claimed in claim 18, wherein the processing of the image information further comprises determining as a disparity a difference in phase between a signal of the filtered image information and a signal of said other of the first and second image information, and the controlling the position of the lens is based on the disparity.

* * * * *